US009648018B2

(12) United States Patent
Donovan (10) Patent No.: US 9,648,018 B2
(45) Date of Patent: May 9, 2017

(54) METHODS, SYSTEMS, AND COMPUTER READABLE MEDIA FOR CONTROLLING DEEP PARSING OF DIAMETER MESSAGES

(71) Applicant: Oracle International Corporation, Redwood Shores, CA (US)

(72) Inventor: Steven Robert Donovan, Dallas, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 326 days.

(21) Appl. No.: 14/268,635

(22) Filed: May 2, 2014

(65) Prior Publication Data

US 2015/0319267 A1     Nov. 5, 2015

(51) Int. Cl.
     *G06F 15/16*        (2006.01)
     *H04L 29/06*       (2006.01)

(52) U.S. Cl.
     CPC .......... *H04L 63/0892* (2013.01); *H04L 67/42* (2013.01); *H04L 69/22* (2013.01); *H04L 69/24* (2013.01)

(58) Field of Classification Search
     CPC ............. H04L 65/1016; H04L 63/0892; H04L 12/1407; H04L 41/0816; H04L 69/00; H04L 69/22; H04L 69/22; H04W 12/06
See application file for complete search history.

(56) References Cited

U.S. PATENT DOCUMENTS

| 8,448,234 B2 * | 5/2013 | Mondaeev | .......... H04L 63/1408 370/250 |
| 2009/0232011 A1 * | 9/2009 | Li | .......... H04L 43/50 370/248 |
| 2013/0205305 A1 * | 8/2013 | Lv | .......... H04W 4/00 719/313 |
| 2014/0372593 A1 * | 12/2014 | Mann | .......... H04L 67/28 709/223 |

OTHER PUBLICATIONS

Korhonen et al., "Diameter Overload Indication Conveyance," draft-ietf-dime-ovli-02.txt, pp. 1-41 (Mar. 27, 2014).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 12)," 3GPP TS 29.272, V12.4.0, pp. 1-129 (Mar. 2014).

(Continued)

*Primary Examiner* — Chirag R Patel
*Assistant Examiner* — Rachel J Hackenberg
(74) *Attorney, Agent, or Firm* — Jenkins, Wilson, Taylor & Hunt, P.A.

(57) ABSTRACT

A system for controlling deep parsing of Diameter messages comprises a Diameter node. The Diameter node includes at least one processor and a Diameter parsing engine for receiving a Diameter message, determining whether the message includes a Diameter deep parse indicator, for determining whether or not to perform deep parsing of the message based on the presence, absence, or value the Diameter deep parse indicator, and performing or refraining (Continued)

from performing deep parsing of the message based on results of the determining.

20 Claims, 7 Drawing Sheets

(56) References Cited

OTHER PUBLICATIONS

"3rd Generation Partnership Project; Technical Specification Group Core Network and Terminals; Cx and Dx interfaces based on the Diameter protocol; Protocol details (Release 12)," 3GPP TS 29.229, V12.0.0, pp. 1-37 (Jun. 2013).
Roach et al., "A Mechanism for Diameter Overload Control," draft-roach-dime-overload-ctrl-03, pp. 1-49 (May 17, 2013).
Roach, "A Mechanism for Diameter Overload Control" draft-roach-dime-overload-ctrl-01, pp. 1-36 (Oct. 22, 2012).
"Digital cellular telecommunications system (Phase 2+); Universal Mobile Telecommunications System (UMTS); LTE; Sh interface based on the Diameter protocol; Protocol details (3GPP TS 29.329 version 10.2.0 Release 10)," ETSI TS 129 329, V10.2.0, pp. 1-23 (May 2011).
"Universal Mobile Telecommunications System (UMTS); Policy and charging control over Gx reference point (3GPP TS 29.212 version 7.4.0 Release 7)," ETSI TS 129 212, V7.4.0, pp. 1-45 (Apr. 2008).

\* cited by examiner

METHODS, SYSTEMS, AND COMPUTER READABLE MEDIA FOR CONTROLLING DEEP PARSING OF DIAMETER MESSAGES

TECHNICAL FIELD

The subject matter described herein relates to parsing Diameter messages. More particularly, the subject matter described herein includes methods, systems and computer readable media for controlling deep parsing of Diameter messages.

BACKGROUND

Diameter messages often include multiple attribute-value pairs (AVPs) that Diameter applications use for the exchange of Diameter application information. For example Diameter applications may use Diameter AVPs to exchange Diameter overload capabilities with each other so that the Diameter applications can subsequently exchange Diameter overload control information. One example of how Diameter nodes may exchange Diameter overload control capabilities is described in Internet Engineering Task Force (IETF) Internet draft draft-roach-dime-overload-ctrl-03, May 17, 2013, (hereinafter, "Roach Diameter Overload Control Internet Draft"), the disclosure of which is incorporated herein by reference in its entirety. Another example of how Diameter nodes may exchange Diameter overload control capabilities is described in IETF Internet draft draft-ietf-dime-ovli-02.txt, Mar. 27, 2014 (hereinafter, "OVLI Diameter Overload Control Internet Draft"), the disclosure of which is incorporated herein by reference in its entirety. The Roach Diameter Overload Control Internet Draft is now expired and thus not a standards-track Internet Draft. The OVLI Diameter Overload Control Internet Draft expires Sep. 28, 2014, and is currently believed to be a standards-track Internet Draft. Both Internet Drafts use AVPs to carry overload control capabilities, and either may be implemented in a Diameter network.

One problem with using Diameter AVPs to exchange Diameter application information occurs when the applications are required to include the AVPs in each message and the information does not change often. Continuing with the overload control example, two Diameter nodes may initially exchange overload control capabilities and continue to include the overload control capabilities information in subsequent messages. However, the overload control capabilities of an application may not change until a software upgrade, which is infrequent. Each Diameter application is required to parse all of the Diameter AVPs it receives, even though the overload control capabilities remain unchanged. This unnecessary parsing wastes processing resources of Diameter nodes.

As extensions to overload control and Diameter applications continue to be defined, the number of extension AVPs in Diameter messages continue to increase. When such extension AVPs are included in each message and do not change frequently, the repeated processing of such AVPs is unnecessary. Accordingly, what is needed is a mechanism for selectively processing of Diameter extension AVPs based on changes to such AVPs.

In light of these and other difficulties, there exists a need for methods, systems, and computer readable media for controlling deep parsing of Diameter messages.

SUMMARY

The subject matter described herein includes methods, systems and computer readable media for controlling deep parsing of Diameter messages. One exemplary system includes a Diameter node including at least one processor. The system further includes a Diameter parsing engine for receiving a Diameter message, determining whether the message includes a Diameter deep parse indicator, determining whether or not to perform deep parsing of the message depending on whether or not the message includes the Diameter deep parse indicator, and performing or refraining from performing deep parsing of the message based on results of the comparison.

The subject matter described herein can be implemented using a non-transitory computer readable medium having stored thereon executable instructions that when executed by the processor of a computer control the computer to perform steps. Exemplary computer readable media for implementing the subject matter described herein may include chip memory devices, disk memory devices, programmable logical devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be described with reference to the accompanying drawings of which.

DETAILED DESCRIPTION

Methods, systems, and computer readable media for controlling deep parsing of Diameter messages are provided. Rather than performing deep parsing of every Diameter message received by a Diameter node, the subject matter described herein controls deep parsing of Diameter messages using a Diameter deep parse indicator. In one embodiment, a sending node inserts a Diameter deep parse indicator in messages for which deep parsing is required. A receiving node only performs deep parsing of received Diameter messages if the Diameter deep parse indicator is present in the messages. If a Diameter deep parse indicator is not present, the receiving node may only perform parsing of Diameter AVPs that are necessary for the function of the receiving Diameter node. For example, if the receiving Diameter node is a Diameter relay agent and the Diameter deep parse indicator is not present in a received message, the relay agent may only parse Diameter routing AVPs, ignoring other AVPs, such as overload control AVPs. In another example, if the receiving Diameter node is a Diameter redirect agent and the deep parse indicator is not present in a received message, the redirect agent may only process AVPs relevant to the redirect function. Because deep parsing is selectively performed only when needed, Diameter node processing resources are conserved.

The subject matter described herein is not limited to performing deep parsing only when the Diameter deep parse indicator is present in a message. In an alternate embodiment, deep parsing may be performed when the deep parse indicator is absent and not performed when the deep parse indicator is present. In yet another alternate implementation, the Diameter deep parse indicator may include one value that indicates that Diameter deep parsing is to be performed and another value that indicates that deep Diameter parsing is not to be performed. Any of these implementations is intended to be within the scope of the subject matter described herein. For simplicity, the remaining description herein will assume that Diameter deep parsing is only performed when the deep parse indicator is present in a received message.

The Diameter deep parse indicator may be included in any field in a Diameter message. In one example, the Diameter deep parse indicator may be a bit in the Diameter header. In another example, the Diameter deep parse indicator may be defined as a new Diameter AVP. Although some processing overhead is incurred in processing the deep parse indicator, such processing overhead is less than that of processing multiple Diameter extension headers that do not change in every Diameter message.

The Diameter deep parse indicator can be used to trigger selective parsing of Diameter extension AVPs, such as Diameter overload control AVPs and Diameter application AVPs, that do not change frequently or that are not required for the functionality of the receiving node.

Figure 1:
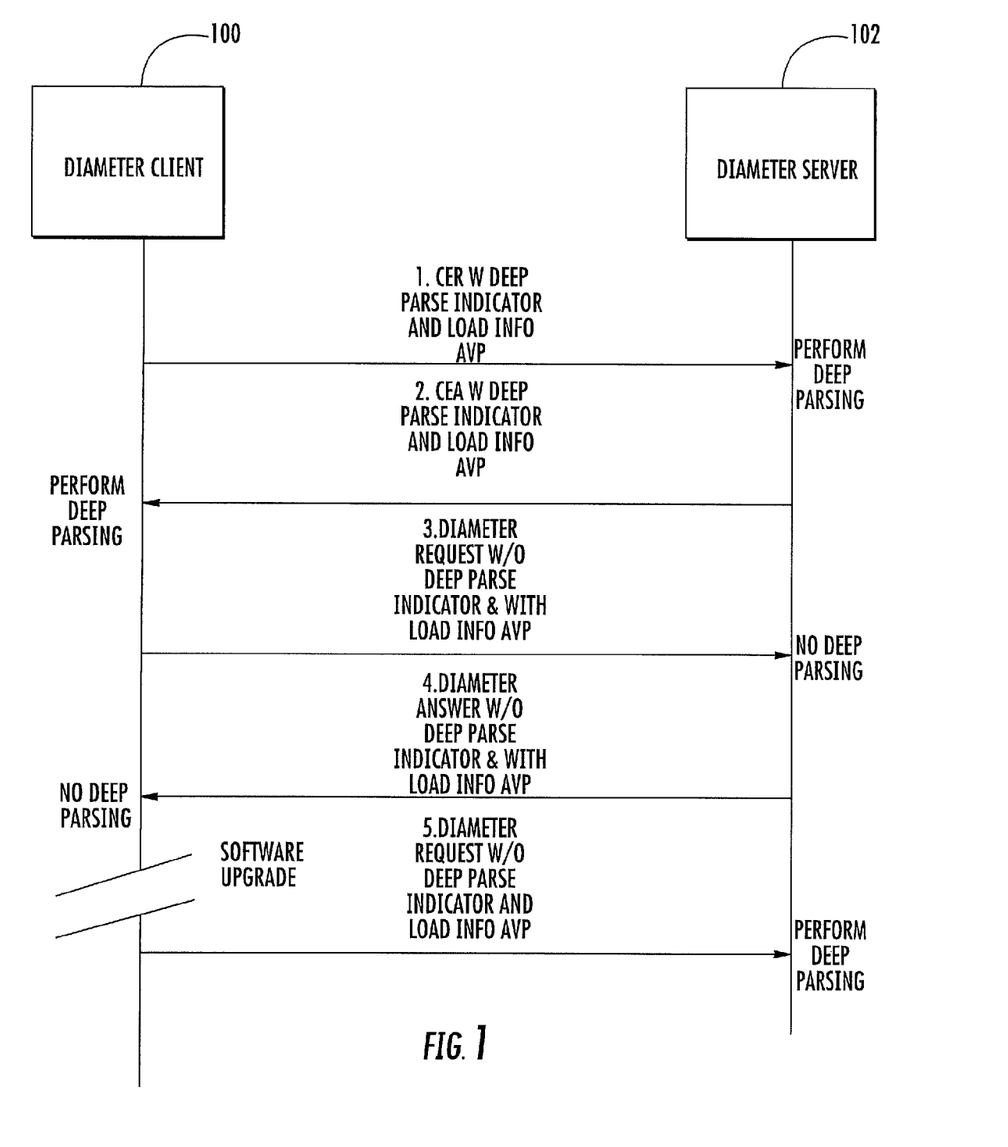
FIG. 1 is a message flow diagram illustrating exemplary Diameter nodes exchanging Diameter messages and controlling deep parsing of overload control information in Diameter messages according to an embodiment of the subject matter described herein.

FIG. 1 is a message flow diagram illustrating Diameter clients and servers that utilize Diameter deep parse indicators to control deep parsing of Diameter signaling messages according to an embodiment of the subject matter described herein. In this example, the deep parse indicator is used to reduce unnecessary parsing of Diameter overload control information. However, it is understood that the deep parse indicator can be used to control parsing of any type of Diameter AVPs without departing from the subject matter described herein. Referring to FIG. 1, a Diameter client 100 establishes a transport layer connection with a Diameter server 102, After establishing the connection, Diameter client 100 sends a Diameter capabilities exchange request (CER) message to Diameter server 102. The CER message includes overload control capabilities information carried in a Load-Info AVP. In this example, client 100 also inserts a deep parse indicator to indicate to server 102 that the CER message includes overload control information that needs to be processed. The Load-Info AVP is defined in the Roach Diameter Overload Control Internet Draft and may contain one or more Overload-Algorithm AVPs. If present, these AVPs indicate every Overload-Algorithm the connection initiator is willing to support for the connection that is being established. If the connection initiator supports only the "Loss" algorithm, it may indicate this fact by omitting the Overload-Algorithm altogether.

The Load-Info AVP in a CER message may also contain additional AVPs, in documents other than the Roach Diameter Overload Control Internet Draft, for the purpose of negotiation of extensions to overload control. The basic format of the Load-Info AVP without any extensions is as follows:

< Load-Info > ::= <
AVP Header: 1600 >
< Overload-Metric >
* { Overload-Info-Scope }
[ Supported-Scopes ]
    * [ Overload-Algorithm ]
    [ Period-Of-Validity ]
[ Session-Group ]
[ Load ]
* [ AVP ]

Each of the fields that are present in a Load-Info AVP must be parsed by the receiving node. After two nodes that support Diameter overload control exchange overload control capabilities via using Load-Info AVPs, the nodes must include one or more Load-Info AVPs in each message they exchange, even if the overload control capabilities and overload state do not change. As a result, unnecessary parsing by the receiving node wastes processing resources of the receiving node. It is this processing for overload control and/or any other Diameter AVPs that are required to be parsed, included in more than one message, and do not change frequently, that the Diameter deep parse indicator described herein is used to avoid.

Returning to the example illustrated in FIG. 1, Diameter server 102 receives the CER message with the Diameter deep parse indicator and Load-Info AVP. Diameter server 102 first examines the message for the presence of the Diameter Deep parse indicator. If the message includes the Diameter deep parse indicator, Diameter server 102 examines the message for the presence of a Load-Info AVP. If the Diameter deep parse indicator is not present, the Diameter server 102 concludes that deep parsing is not required, and no further parsing of the message other than that for required functionality of the receiving node, is performed. If the message includes a Diameter deep parse indicator but no Load-Info AVP, server 102 concludes that overload control is not supported for the connection. In such a case, the Diameter deep parse indicator may be included in the message to trigger server 102 to perform deep parsing of the CER message to extract Diameter application information for a Diameter application other than overload control If the received CER contains a Diameter deep parse indicator and a Load-Info AVP, Diameter server 102 performs deep parsing of the message, stores the information carried in the Load-Info AVP locally in the context of the connection being established. Server 102 then examines the Overload-Algorithm AVPs, if present, and selects a single algorithm from that list. If no Overload-Algorithm is indicated, then the base "Loss" algorithm is used for the connection. In either case, server 102 stores this algorithm in the context of the connection.

When server 102 sends a Capabilities-Exchange-Answer (CEA) message in answer to a CER that contained a Load-Info AVP, the CEA contains a Load-Info AVP and a Diameter deep parse indicator to trigger client 100 to perform deep parsing of the Diameter message to determine the Diameter overload capabilities of server 102. According to the Roach Diameter Overload Control Internet Draft, the Load-Info AVP must contain a Supported-Scopes AVP that includes a comprehensive list of scopes supported that the connection initiator can receive and understand. The CEA also contains zero or one Overload-Algorithm AVPs. If present, this Overload-Algorithm must match one of the Overload-Algorithm AVPs sent in the CER, and the Overload-Algorithm AVP indicates the overload control algorithm that will be used for the connection. If the CEA contains no Overload-Algorithm, the connection will use the "Loss" algorithm.

When client 100 receives the CEA message, it examines the message for the presence of a Diameter deep parse indicator. If the message includes a Diameter deep parse indicator, client 100 performs deep parsing of the message to determine the presence of a Load-Info AVP. If the CEA message does not include a Diameter deep parse indicator, client 100 refrains from performing deep parsing of the message to determine the presence of the load-info AVP, thus saving processing resources. If the message includes a Diameter deep parse indicator but no load info AVP, client 100 concludes that the overload mechanism is not supported for this connection but may perform deep parsing of the message to extract Diameter AVPs for a Diameter capability other than overload control. If the received CEA contains a Load-Info AVP, then client 100 extracts the Supported-Scopes information, and stores them locally in the context of the connection being established. Client 100 then checks for the presence of an Overload-Algorithm AVP. If present, this AVP indicates the overload control algorithm that will be used for the connection. If absent, then the connection will use the "Loss" algorithm.

If a client 100 receives a CEA message that indicates support for a scope that client 100 did not indicate in its CER or which selects an overload control algorithm that client 100 did not advertise in its CER, then client 100 must, according to the Roach Diameter Overload Control Internet Draft, terminate the connection by sending a DPR with a Disconnect-Cause of NEGOTIATION_FAILURE, indicating that the CEA sender has failed to properly follow the negotiation process described above.

After the initial overload capabilities exchange, client 100 and server 102 may exchange Diameter request and response messages. According to the Roach Diameter Overload control Internet Draft, each request and response message must include Load-Info AVPs to communicate overload information and any change in overload control capabilities information. In the illustrated example, client 100 and server 102 selectively insert the Diameter deep parse indicator in messages they exchange to control whether or not the receiving Diameter node is required to perform deep parsing of the received messages. For example, if software of client 100 or server 102 is upgraded to support new Diameter overload control capabilities, in the next message that client 100 or server 102 sends, client 100 or server 102 may insert a Diameter deep parse indicator in the message to trigger the receiving node to process the Load-Info AVP that includes the new overload control capabilities.

Figure 2:
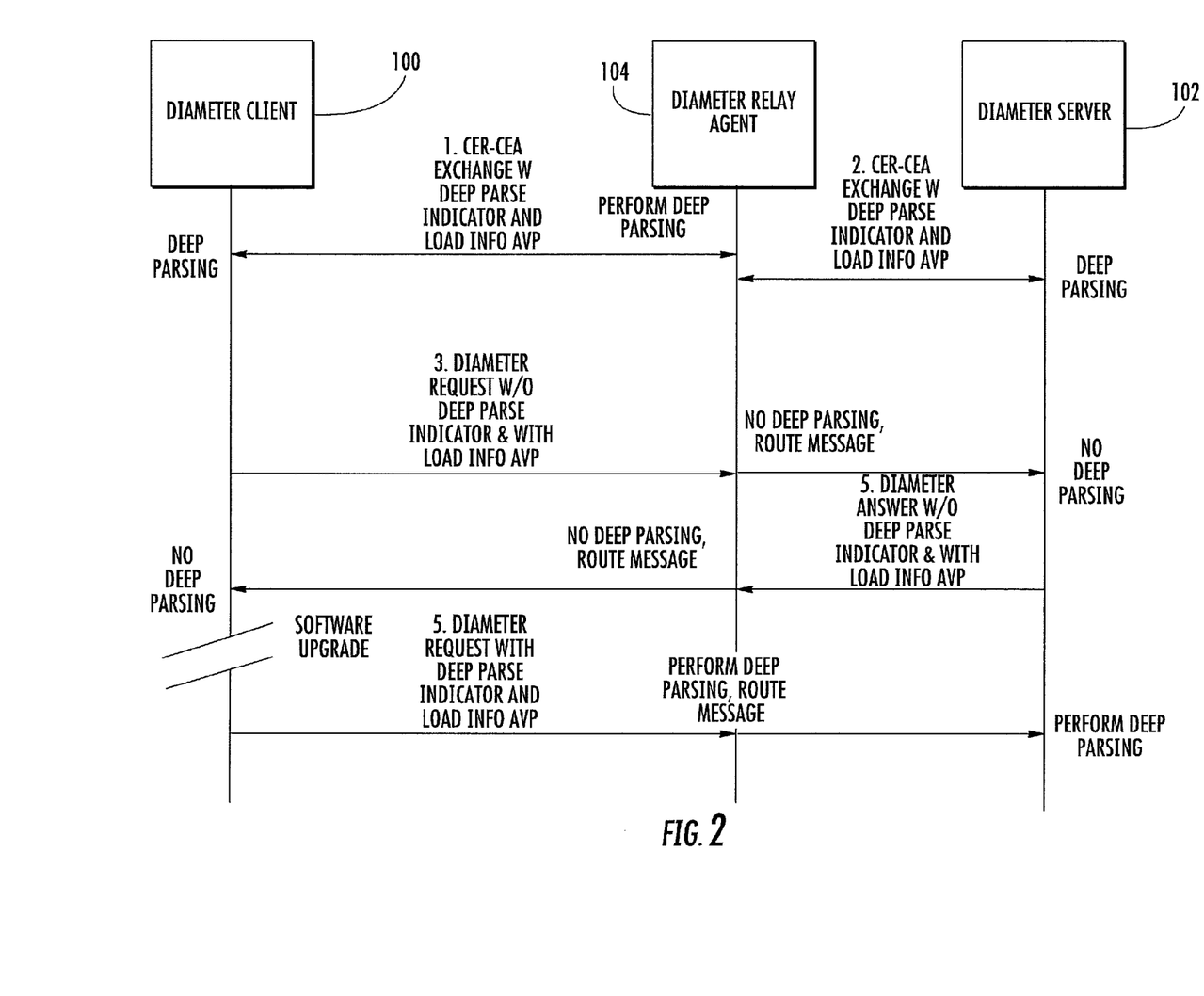
FIG. 2 is a message flow diagram illustrating Diameter nodes exchanging messages via a Diameter relay agent and controlling deep parsing of overload control information in Diameter messages according to an embodiment of the subject matter described herein.

In FIG. 1, the Diameter deep parse indicator is used by Diameter clients and servers to control deep parsing of overload control information in Diameter messages. The Diameter deep parse indicator may also be used by other types of Diameter nodes to control deep parsing of Diameter messages and for purposes other than overload control. FIG. 2 is a message flow diagram illustrating the use of a Diameter deep parse indicator to control deep parsing of overload control information by a Diameter relay agent. Referring to FIG. 2, Diameter client 100 sends messages to Diameter server 102 through a Diameter relay agent (DRA) 104. Diameter relay agent 104 may perform routing of Diameter messages based on destination-realm AVP present in the message. Since according to the Roach Diameter Overload Control Internet Draft, overload control is performed on a hop by hop basis, the overload control dialog between client 100 and Diameter relay agent 104 and between Diameter relay agent 104 and server 102 may be similar to that illustrated in FIG. 1. When receiving a message from client 100 or server 102, Diameter relay agent 104 may first examine the message for the presence of a Diameter deep parse indicator. If the message includes a Diameter deep parse indicator, Diameter relay agent 104 may perform deep parsing of overload control information in the messages. If the message does not include a Diameter deep parse indicator, Diameter relay agent 104 may refrain from performing deep parsing of the overload control information message. Similarly, on the send side, Diameter relay agent 104 may insert the Diameter deep parse indicator to trigger the destination to perform deep parsing of the information in the message that Diameter relay agent transmits and may omit the Diameter deep parse indicator from messages for which Diameter relay agent 104 does not desire the receiving node to process overload control information. According to the OVLI Overload Control Internet Draft, overload control may be communicated end to end instead of hop to hop. In the end to end case, the overload control information would still pass through an intermediate DRA, such as DRA 104, and the deep parse indicator could be used to control selective deep parsing of the overload control information by DRA 104 in the same manner described herein for the hop by hop case.

Referring to the message flow in FIG. 2, in step 1, Diameter client 100 and Diameter relay agent 104 exchange CER and CEA messages to determine supported overload control capabilities. The CER and CEA messages may include load information AVPs to trigger Diameter relay agent 104 and Diameter client 100 to perform deep parsing and process the load info AVPs in the messages. In step 2, Diameter relay agent 104 and Diameter server 102 exchange CER and CEA messages to agree on a set of overload control capabilities. Diameter relay agent 104 and Diameter server 102 may include deep parse indicators in the CER and CEA messages so that the info AVPs will be processed.

In step 3, Diameter client 100 sends a message addressed to Diameter server 102 via Diameter relay agent 104. The request does not include a Diameter deep parse indicator, but the request does include a load info AVP. In such an example, Diameter relay agent 104 receives the message and determines that the deep parse indicator is not present. As a result, Diameter relay agent 104 refrains from performing deep parsing of the message and parses only the destination-realm AVP and possibly other routing AVPs in the message. Diameter relay agent 104 then forwards the request message to Diameter server 102. Diameter server 102 receives the request message, determines that the deep parse indicator is not present, and does not process the load info AVP in the message. Thus, in step 3, the Diameter deep parse indicator inserted by Diameter client 100 is used to avoid unnecessary deep parsing by both Diameter relay agent 104 and Diameter server 102.

In step 4, Diameter server 102 generates a Diameter answer message in response to the request message. The diameter answer message does not include a deep parse indicator but does include a load info AVP. Diameter relay agent 104 receives the Diameter answer message, determines that the deep parse indicator is not present, refrains from performing deep parsing of the message, and processes only AVPs relevant to routing. Diameter relay agent 104 then forwards the answer message to Diameter client 100. Diameter client 100 similarly examines the answer message, determines that the deep parse indicator is not present, refrains from processing the load info AVP in the message, and processes the answer.

In step 5, it is assumed that Diameter client 100 experiences a software upgrade or other change that affects the overload control capabilities of Diameter client 100. Accordingly, in step 6, Diameter client 100 sends a Diameter request message to Diameter server 102. In the request message, the deep parse indicator and the load info AVP are included. Upon receiving the message, Diameter relay agent 104 determines that the message includes the deep parse indicator, performs deep parsing of the message, and parses the load info AVP. Diameter relay agent 104 routes the message including the deep parse indicator to Diameter server 102 which likewise performs deep parsing of the message. Thus, by selectively including the deep parse indicator in Diameter messages, Diameter nodes can selectively control deep parsing of Diameter AVPs by intermediate nodes, such as Diameter relay agents. However, it should be noted that the subject matter described herein may be used to selectively control deep parsing by any intermediate or end nodes, including Diameter redirect agents, proxy agents, etc. For example, for the redirect agent case, such nodes would typically only be required to process the destination-realm AVP in order to perform the redirect function. Including the deep parse indicator in a message sent to a Diameter redirect agent could trigger the re-direct agent to only parse the destination realm AVP and ignore any extension or application AVPs in the message.

As set forth above, Diameter nodes may utilize the OVLI Diameter Overload Control Internet Draft method for exchanging overload control capabilities. According to the OVLI Diameter Overload Control Internet Draft, rather than using the Load-Info AVP to exchange overload control capabilities, a new AVP, referred to as the OC-Supported-Features AVP, is used to communicate overload control capabilities between nodes. The OC-Supported Features AVP includes an OC-Feature-Vector AVP. The OC-Feature-Vector AVP is used to announce Diameter overload indication conveyance (DOIC) capabilities supported by an endpoint.

Like the load-info AVP, the OC-Supported-Features AVP must be included an every Diameter message that a Diameter node compliant with the OVLI Diameter Overload Control Internet Draft sends. Also, because as node's overload control capabilities are unlikely to change frequently, the OC-Supported Features AVP is unlikely to change frequently. The Diameter deep parse indicator may be used in the same manner described above with respect to FIGS. 1 and 2 to trigger deep parsing of Diameter messages, including deep parsing of the OC-supported features AVP, when the Diameter overload control capabilities are first communicated to a receiving node and thereafter, only when the overload control capabilities of a sending node change.

As also set forth above, the subject matter described herein is not limited to using the deep parse indicator to selectively control the parsing of overload control AVPs. In an alternate example, the deep parse indicator may be used to selectively control parsing of application level feature information. For example, Diameter clients and Diameter servers may exchange supported features AVPs to notify each other of application level features other than overload control supported by the client and the server. One example of such an exchange is described in 3GPP TS 29.329 v. 10.2.0, release 10, Sh Interface Based on Diameter Protocol; Protocol Details, May 2011, the disclosure of which is incorporated herein by reference in its entirety. The content of the supported features AVP is described in 3GPP TS 29.229, v. 12.0.0, release 12, Cx and Dx Interfaces based on the Diameter Protocol; Protocol Details, June 2013, the disclosure of which is incorporated herein by reference in its entirety. According to TS 29.329 and TS 29.229, a Diameter client and a Diameter server may exchange supported features AVPs to identify which application level features the Diameter application on each node supports. According to TS 29.229, the supported features AVP includes a feature list ID AVP, which identifies supported features. Examples of supported features that may be identified using the feature list ID AVP are the shared initial filter criteria (iFC) sets feature between the home subscriber server (HSS) and the serving call session control function (S-CSCF), the alias indication feature between the HSS and the S-CSCF, and the IMS restoration indication feature between the HSS and the interrogating CSCF (I-CSCF). Because the supported features of an application are unlikely to change frequently, the deep parse indicator as described herein may be used to selectively control parsing of the supported features AVP.

Figure 3:
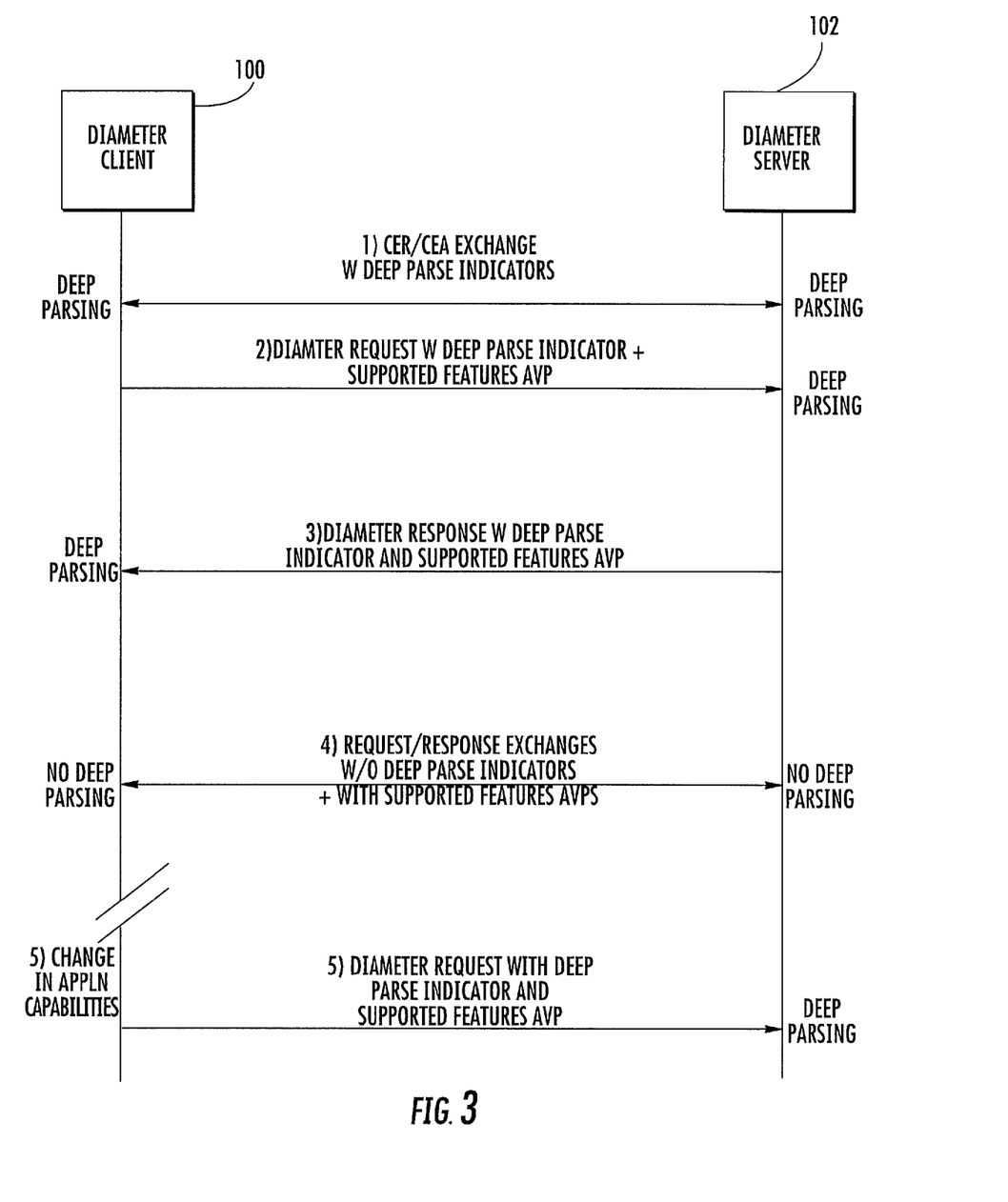
FIG. 3 is a message flow diagram illustrating exemplary Diameter nodes exchanging Diameter messages and controlling deep parsing of application layer feature negotiation information in Diameter messages according to an embodiment of the subject matter described herein.

FIG. 3 is a message flow diagram illustrating the user of the Diameter deep parse indicator to selectively control parsing of the supported features AVP. Referring to FIG. 3, a Diameter client 100 and a Diameter server 102 may communicate with each other over a Diameter interface, such as an Sh interface. In such an example, Diameter client 100 may be an application server (AS), an S-CSCF or I-CSCF and Diameter server 102 may be an HSS. Referring to the example illustrated in FIG. 3, in step 1, Diameter client 100 and Diameter server 102 exchange CER and CEA messages. The messages may include deep parse indicators to indicate that deep parsing is required. In line 2, Diameter client 100 sends a Diameter request message to Diameter server 102. The Diameter request message includes the deep parse indicator and the supported features AVP. In response to receiving the request message with the deep parse indicator, Diameter server 102 performs deep parsing of the message, which includes parsing the supported features AVP. In step 3, Diameter server 102 sends a Diameter response to Diameter client 100. The response includes the deep parse indicator and the supported features AVP indicating features supported by server 102. In response to receiving the response with the deep parse indicator, Diameter client 100 performs deep parsing of the message, including the supported features AVP.

In step 4, Diameter client 100 and Diameter server 102 exchange Diameter requests and responses without deep parse indicators and with the supported features AVP. However, because the deep parse indicators are not present in the messages, deep parsing of the supported features AVPs can be avoided because such features are unchanged. In step 5, a change in application capabilities occurs at client 100. Such a change may be caused by a software upgrade. Accordingly, in step 6, Diameter client 100 sends a Diameter request with the deep parse indicator and the supported features AVP. In response to receiving the request, Diameter server 102 performs deep parsing of the Diameter request.

Figure 4:
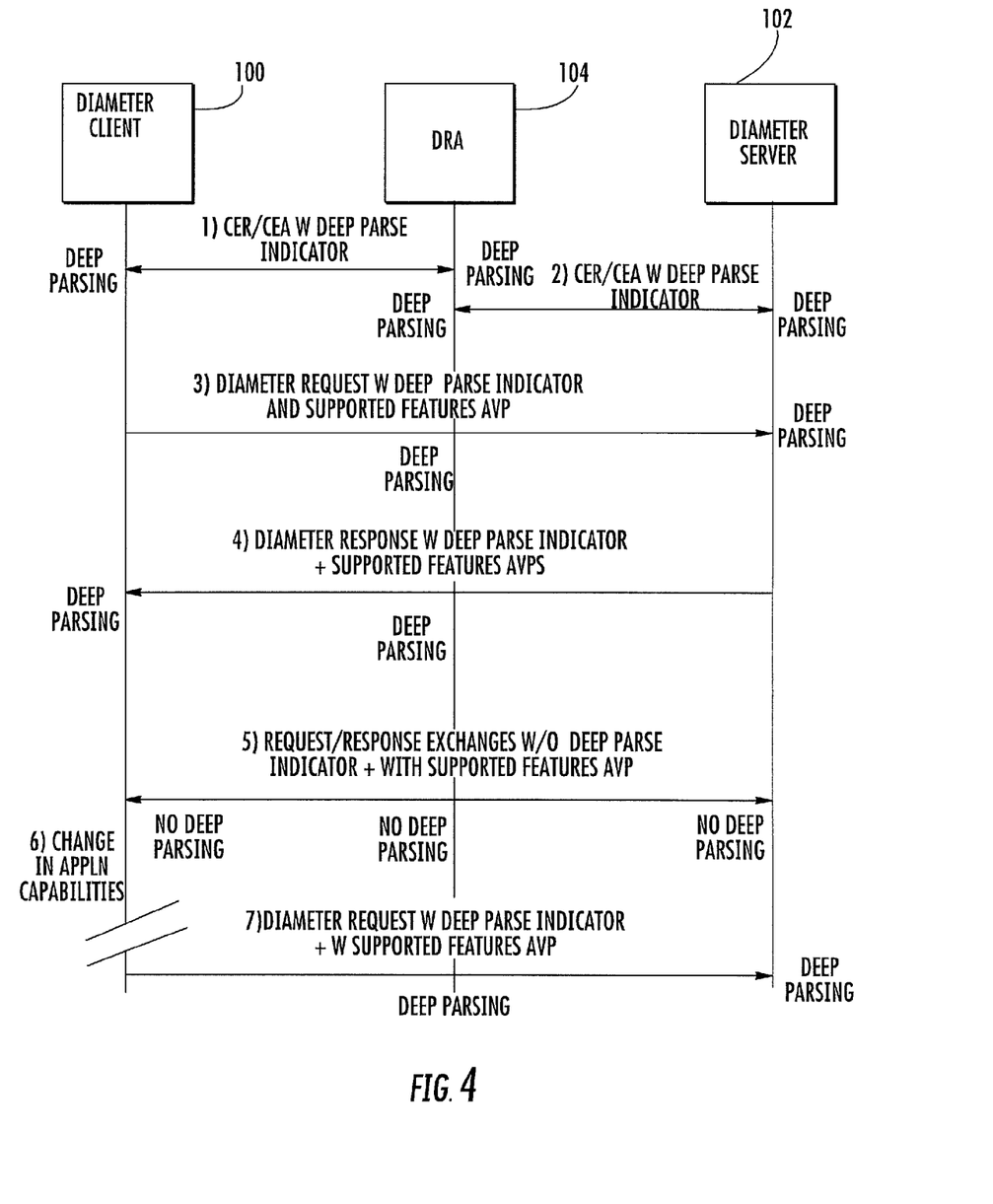
FIG. 4 is a message flow diagram illustrating Diameter nodes exchanging messages via a Diameter relay agent and controlling deep parsing of application layer feature negotiation in the messages according to an embodiment of the subject matter described herein.

FIG. 4 is a message flow diagram similar to the message flow diagram illustrated in FIG. 3 except that a DRA is located between Diameter client 100 and Diameter server 102. Referring to the message flow illustrated in FIG. 4, in steps 1 and 2, Diameter client 100 and Diameter server 102 each exchange CER and CEA messages with DRA 104. The CER and CEA messages may include deep parse indicators that trigger the receiving node to perform deep parsing. In step 3, Diameter client 100 sends a Diameter request message with the deep parse indicator and the supported features AVP to Diameter server 102. Because the request message includes the deep parse indicator, DRA 104 and Diameter server 102 perform deep parsing of the message. In step 4, the Diameter server 102 sends a Diameter response message with the deep parse indicator and the supported features AVP to Diameter client 100. The message includes the deep parse indicator. Accordingly, DRA 104 and Diameter client 100 each perform deep parsing of the message. In step 5, Diameter client 100 and Diameter server 102 exchange requests and response messages without deep parse indicators and with supported features AVPs. Because the messages do not include the deep parse indicators, no deep parsing is performed by client 100, DRA 104, or server 102. In step 6, a change in application level capabilities occurs at client 100. Accordingly, in line 7, Diameter client 100 sends the Diameter request with the deep parse indicator and the supported features AVP. Because the message includes the deep parse indicator, DRA 104 and Diameter server 102 perform deep parsing of the message. Thus, as illustrated in FIGS. 3 and 4, the deep parse indicator can be used to control deep parsing of supported features AVPs in Diameter messages.

The supported features AVP is not limited to being used on the Sh interface. The supported features AVP may also be used between a mobility management entity (MME) and the HSS on the S6a interface, as described in 3GPP TS 29.272, v. 12.4.0, Evolved Packet System (EPS) Mobility Management Entity (MME) and Serving GPRS Support Node (SGSN) Interfaces Based on Diameter Protocol, March 2014, the disclosure of which is incorporated herein by reference in its entirety. Thus, the Diameter deep parse indicator may be used to control selective processing of the supported features AVP on the S6a interface. In such an example, processing may be the same as that illustrated in FIGS. 3 and 4.

Figure 5:
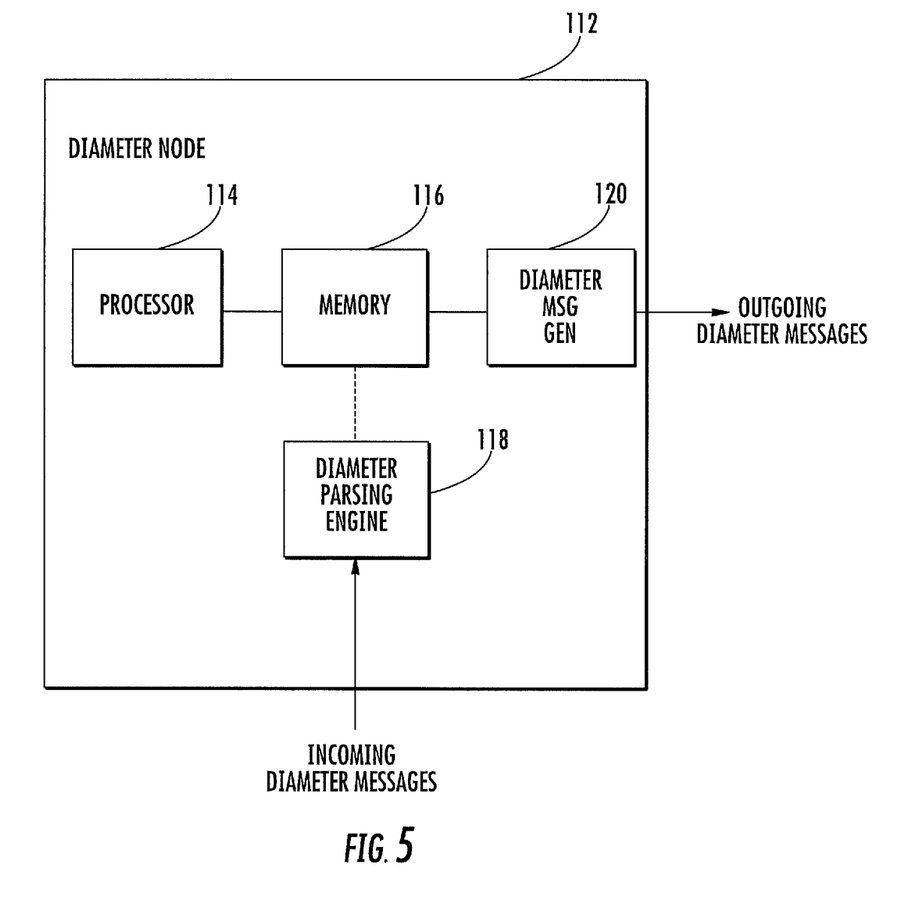
FIG. 5 is a block diagram illustrating a Diameter node including functionality for controlling deep parsing of Diameter messages according to an embodiment of the subject matter described herein.

FIG. 5 is a block diagram illustrating an exemplary Diameter node for controlling deep parsing of Diameter messages using a deep parsing indicator according to an embodiment of the subject matter described herein. Referring to FIG. 5, Diameter node 112 includes a processor 114 and a memory 116. Processor 114 may be a microprocessor that includes at least some hardware. Processor 114 may also be implemented using a field programmable gate array (FPGA). Memory 116 may store instructions executable by processor 114 to control deep parsing of Diameter messages using a deep parsing indicator. In the illustrated example, memory 116 stores a Diameter parsing engine 118 for determining whether or not to perform deep parsing of incoming Diameter messages based on the presence or absence of a deep parse indicator and for selectively performing such parsing based on the presence or absence of the deep parse indicator. Memory 116 also includes a Diameter message generator 120 for generating outgoing Diameter messages and for selectively including the Diameter deep parse indicator in the outgoing messages depending on whether or not deep parsing of the outgoing Diameter messages is required. Diameter node 112 may be any of the Diameter nodes described herein, such as a Diameter server, a Diameter client, a Diameter relay agent, a Diameter redirect agent, or specific types of Diameter clients and servers that use the Diameter protocol, such as a PCRF, a PCEF, an HSS, an MME, an S-CSCF, an I-CSCF, an online charging system (OCS), an offline charging system (OFCS), etc.

Figure 6:
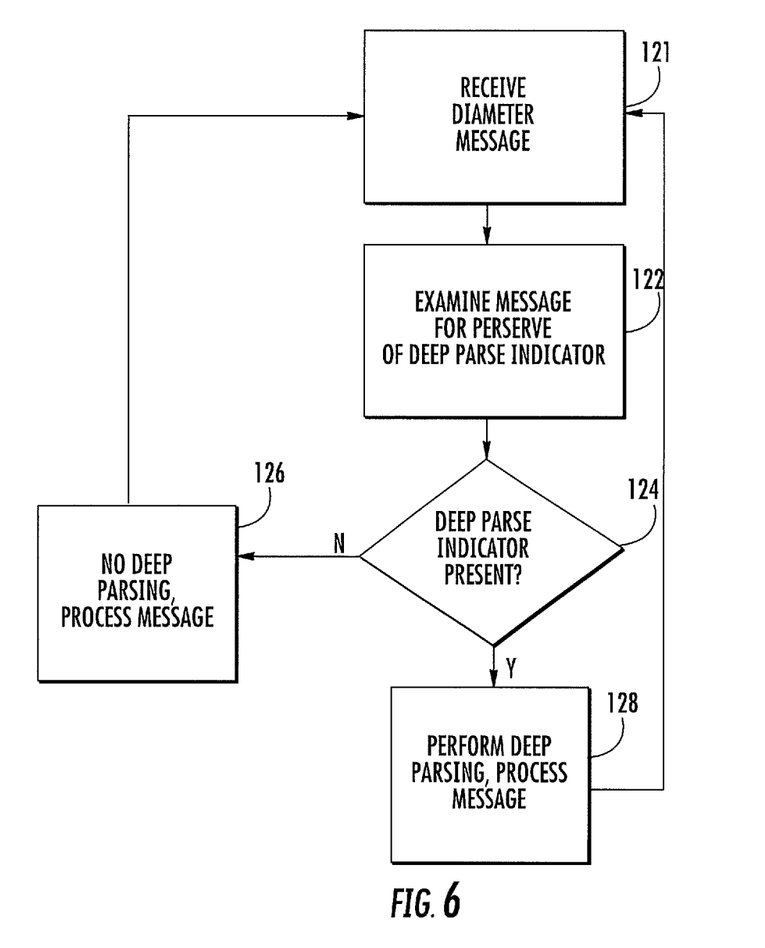
FIG. 6 is a flow chart illustrating an exemplary receive side process for controlling deep parsing of Diameter messages according to an embodiment of the subject matter described herein.

FIG. 6 is a flow chart illustrating exemplary receive side processing performed by a Diameter node to control deep parsing of received Diameter messages according to an embodiment of the subject matter described herein. Referring to FIG. 6, in step 121, a Diameter message is received. The Diameter message may be a CER message, a CEA message, or any other Diameter protocol message. In step 122, the message is examined for the presence of a deep parse indicator. In step 124, indicator is not present, control proceeds to step 126 where no deep parsing is performed, and the message is processed according to the function of the receiving node. For example, if the receiving node is a Diameter relay agent, the message may be routed to its destination based on the destination-realm AVP in the message. If the receiving node is a client or server, the message may be terminated, AVPs required for the client or server functionality may be processed, and an answer may be generated. In step 124, if the deep parse indicator is present, control proceeds to step 128 where deep parsing is performed and the message is processed. Performing deep parsing may include processing Diameter overload control or other extension AVPs that are in the message. Processing the message may include routing, redirecting, or terminating and generating an answer to the message depending on the message type and the function of the receiving node. After step 128, control returns to step 121 where the next message is received.

Figure 7:
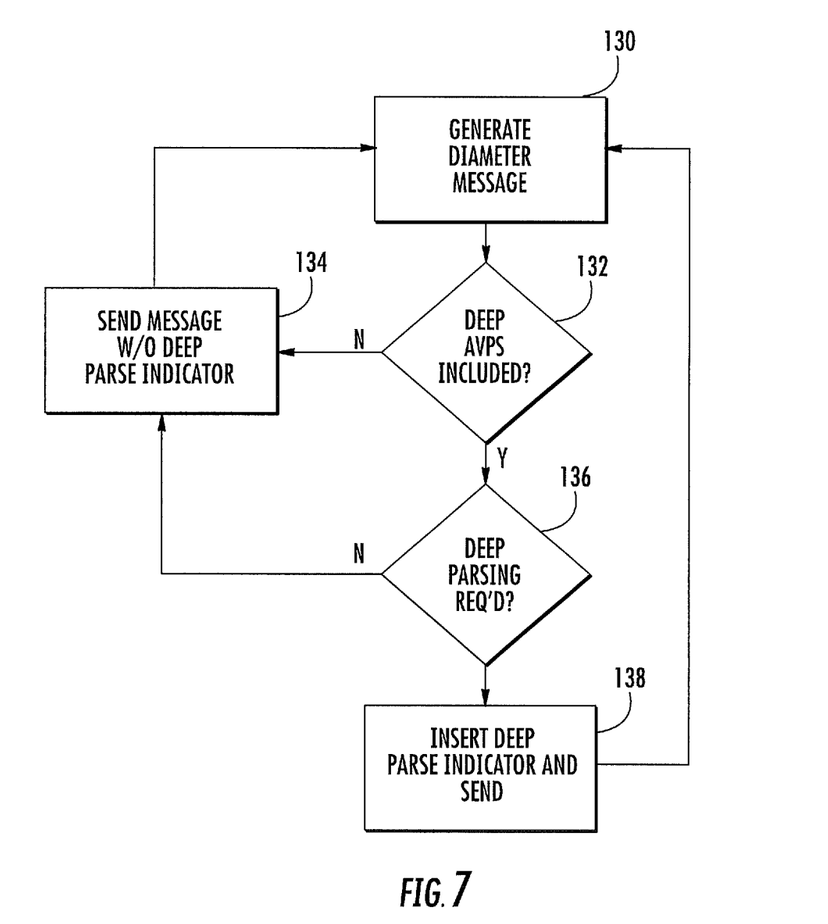
FIG. 7 is a flow chart illustrating an exemplary transmit side process for controlling deep parsing of Diameter messages according to an embodiment of the subject matter described herein.

FIG. 7 is a flow chart illustrating exemplary send side processing performed by a Diameter node for selectively controlling processing of outgoing Diameter messages using a deep parse indicator according to an embodiment of the subject matter described herein. Referring to FIG. 7, in step 130, a Diameter message is generated. For example, Diameter message generator 120 may generate a Diameter request or a Diameter answer message depending on the context of the Diameter dialog in which the node is participating. In step 132, it is determined whether the message includes any deep AVPs, such as overload control, application capabilities AVPs, or other Diameter extension AVPs. If the message does not include such AVPs, control proceeds to step 134 where the message is transmitted without inserting the deep parse indicator. Control then returns to step 130 where the next message is generated.

In step 132, if the message includes deep AVPs, control proceeds to step 134 where it is determined whether deep parsing is required. Determining whether deep parsing is required may include determining whether any of the deep AVPs have changed since the last time the AVPs were communicated over a given connection. If the deep AVPs have changed, deep parsing may be required. If the deep AVPs have not changed, deep parsing may not be required. Similarly, if the deep AVPs are being communicated for the first time for a connection, deep parsing may be required. If deep parsing is not required, control proceeds to step 134 where the message is sent without the deep parse indicator. If in step 136 it is determined that deep parsing is required, control proceeds to step 138 where the deep parse indicator is inserted in the message and the message is transmitted to a destination. Control then returns to step 130 where the next message is generated.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for controlling deep parsing of Diameter messages, the system comprising:
a Diameter node including:
at least one processor; and
a Diameter parsing engine for receiving a Diameter message, determining whether the message includes a Diameter deep parse indicator,
determining whether or not to perform deep parsing of the message based on the presence, absence, or value of the Diameter deep parse indicator,
and performing or refraining from performing deep parsing of the message based on results of the determining,
wherein the Diameter deep parse indicator comprises a parameter that a sending Diameter node selectively inserts in Diameter signaling messages transmitted over a network to a receiving Diameter node to trigger parsing by the receiving Diameter node of Diameter extension and application attribute value pairs (AVPs) that appear in multiple messages when values of the Diameter extension and application AVPs change.

2. The system of claim 1 wherein the Diameter parsing engine determines to perform deep parsing of the message based on the presence of the Diameter deep parse indicator.

3. The system of claim 1 wherein performing deep parsing of the message includes parsing Diameter application layer feature negotiation AVPs.

4. The system of claim 1 wherein performing deep parsing of the message includes parsing Diameter overload control AVPs.

5. The system of claim 1 wherein performing deep parsing of the message includes parsing Diameter extension AVPs.

6. The system of claim 1 wherein the Diameter node comprises a Diameter client or a Diameter server.

7. The system of claim 1 wherein the Diameter node comprises a Diameter relay agent and wherein the Diameter relay agent is configured to only parse Diameter routing AVPs in response to determining that the deep parse indicator indicates that deep parsing is not required.

8. The system of claim 1 wherein the Diameter node comprises a Diameter redirect agent and wherein the Diameter redirect agent is configured to only parse a destination-realm AVP in the message in response to determining that the deep parse indicator indicates that deep parsing is not required.

9. The system of claim 1 wherein the Diameter node is configured to selectively insert the Diameter deep parse indicator in Diameter messages that the Diameter node sends to other Diameter nodes to indicate to the other Diameter nodes whether deep parsing of the Diameter messages is required.

10. The system of claim 9 wherein the Diameter node is configured to insert the Diameter deep parse indicator in a Diameter message that the Diameter node sends to another Diameter node when application level capabilities of the sending Diameter node change.

11. A method for controlling deep parsing of Diameter messages, the method comprising:
at a Diameter node including at least one processor:
receiving a Diameter message;
determining whether the message includes a Diameter deep parse indicator;
determining whether or not to perform deep parsing of the message based on the presence, absence, or value of the Diameter deep parse indicator; and
performing or refraining from performing deep parsing of the message based on results of the determining,
wherein the Diameter deep parse indicator comprises a parameter that a sending Diameter node selectively inserts in Diameter signaling messages transmitted over a network to a receiving Diameter node to trigger parsing by the receiving Diameter node of Diameter extension and application attribute value pairs (AVPs) that appear in multiple messages when values of the Diameter extension and application AVPs change.

12. The method of claim 11 wherein determining whether or not to perform deep parsing of the message includes determining to perform deep parsing of the message based on the presence of the Diameter deep parse indicator.

13. The method of claim 11 wherein performing deep parsing of the message includes processing Diameter application level feature negotiation AVPs.

14. The method of claim 11 wherein performing deep parsing of the message comprises parsing Diameter overload control AVPs.

15. The method of claim 11 wherein performing deep parsing of the message includes parsing Diameter extension AVPs.

16. The method of claim 11 wherein the Diameter node comprises a Diameter client or a Diameter server.

17. The method of claim 11 wherein the Diameter node comprises a Diameter relay agent and wherein the Diameter relay agent is configured to only parse Diameter routing AVPs in response to determining that deep parsing is not required.

18. The method of claim 11 wherein the Diameter node comprises a Diameter redirect agent and wherein the Diameter redirect agent is configured to only parse a destination-realm AVP in response to determining that deep parsing is not required.

19. The method 11 comprising selectively inserting the Diameter deep parse indicator in Diameter messages that the Diameter node sends to other Diameter nodes to indicate to the other Diameter nodes whether deep parsing of the Diameter messages is required.

20. A non-transitory computer readable medium having stored thereon executable instructions that when executed by the processor of a computer control the computer to perform steps comprising:
at a Diameter node including at least one processor:
receiving a Diameter message;
determining whether the message includes a Diameter deep parse indicator;
determining whether or not to perform deep parsing of the message based on the presence, absence, or value of the Diameter deep parse indicator; and
performing or refraining from performing deep parsing of the message based on results of the determining,
wherein the Diameter deep parse indicator comprises a parameter that a sending Diameter node selectively inserts in Diameter signaling messages transmitted over a network to a receiving Diameter node to trigger parsing by the receiving Diameter node of Diameter extension and application attribute value pairs (AVPs)

that appear in multiple messages when values of the Diameter extension and application AVPs change.

* * * * *

UNITED STATES PATENT AND TRADEMARK OFFICE
CERTIFICATE OF CORRECTION

| | |
|---|---|
| PATENT NO. | : 9,648,018 B2 |
| APPLICATION NO. | : 14/268635 |
| DATED | : May 9, 2017 |
| INVENTOR(S) | : Steven Robert Donovan |

It is certified that error appears in the above-identified patent and that said Letters Patent is hereby corrected as shown below:

On the Title Page

Delete the Title Page and substitute therefore with the attached Title Page consisting of the corrected illustrative figure.

In the Drawings

Sheet 3 of 7, Fig. 3:
Replace "2)DIAMTER"
With --2) DIAMETER--.

Please replace FIG. 6 with FIG. 6 as shown on the attached page.

In the Specification

Column 4, Line 57:
Replace "control"
With --control.--.

In the Claims

Column 12, Line 44:
Replace "method 11"
With --method of claim 11--.

Signed and Sealed this
Nineteenth Day of May, 2020

Andrei Iancu
*Director of the United States Patent and Trademark Office*

CERTIFICATE OF CORRECTION (continued)

(12) United States Patent
Donovan (10) Patent No.: US 9,648,018 B2
(45) Date of Patent: May 9, 2017

(54) METHODS, SYSTEMS, AND COMPUTER READABLE MEDIA FOR CONTROLLING DEEP PARSING OF DIAMETER MESSAGES

(71) Applicant: Oracle International Corporation, Redwood Shores, CA (US)

(72) Inventor: Steven Robert Donovan, Dallas, TX (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 326 days.

(21) Appl. No.: 14/268,635

(22) Filed: May 2, 2014

(65) Prior Publication Data
US 2015/0319267 A1   Nov. 5, 2015

(51) Int. Cl.
*G06F 15/16* (2006.01)
*H04L 29/06* (2006.01)

(52) U.S. Cl.
CPC ......... *H04L 63/0892* (2013.01); *H04L 67/42* (2013.01); *H04L 69/22* (2013.01); *H04L 69/24* (2013.01)

(58) Field of Classification Search
CPC ............ H04L 65/1016; H04L 63/0892; H04L 12/1407; H04L 41/0816; H04L 69/00; H04L 69/22; H04L 69/22; H04W 12/06
See application file for complete search history.

(56) References Cited

U.S. PATENT DOCUMENTS

| | | | | |
|---|---|---|---|---|
| 8,448,234 B2* | 5/2013 | Mondaeev | ......... | H04L 63/1408 370/250 |
| 2009/0232011 A1* | 9/2009 | Li | ............. | H04L 43/50 370/248 |
| 2013/0205305 A1* | 8/2013 | Lv | ............. | H04W 4/00 719/313 |
| 2014/0372593 A1* | 12/2014 | Mann | ........ | H04L 67/28 709/223 |

OTHER PUBLICATIONS

Korhonen et al., "Diameter Overload Indication Conveyance," draft-ietf-dime-ovli-02.txt, pp. 1-41 (Mar. 27, 2014).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 12)," 3GPP TS 29.272, V12.4.0, pp. 1-129 (Mar. 2014).
(Continued)

*Primary Examiner* — Chirag R Patel
*Assistant Examiner* — Rachel J Hackenberg
(74) *Attorney, Agent, or Firm* — Jenkins, Wilson, Taylor & Hunt, P.A.

(57) ABSTRACT

A system for controlling deep parsing of Diameter messages comprises a Diameter node. The Diameter node includes at least one processor and a Diameter parsing engine for receiving a Diameter message, determining whether the message includes a Diameter deep parse indicator, for determining whether or not to perform deep parsing of the message based on the presence, absence, or value the Diameter deep parse indicator, and performing or refraining
(Continued)

FIG. 6